United States Patent
Fröberg Olsson et al.

(10) Patent No.: US 10,306,479 B2
(45) Date of Patent: May 28, 2019

(54) TECHNIQUE FOR COMMUNICATING ON UNLICENSED SPECTRUM

(71) Applicant: Telefonaktiebolaget LM Ericsson (publ), Stockholm (SE)

(72) Inventors: Jonas Fröberg Olsson, Ljungsbro (SE); Håkan Andersson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 22 days.

(21) Appl. No.: 15/557,684

(22) PCT Filed: Mar. 13, 2015

(86) PCT No.: PCT/EP2015/055365
§ 371 (c)(1),
(2) Date: Sep. 12, 2017

(87) PCT Pub. No.: WO2016/146155
PCT Pub. Date: Sep. 22, 2016

(65) Prior Publication Data
US 2018/0054741 A1    Feb. 22, 2018

(51) Int. Cl.
*H04W 74/08*    (2009.01)
*H04W 88/06*    (2009.01)
(Continued)

(52) U.S. Cl.
CPC ........... *H04W 16/14* (2013.01); *H04W 48/16* (2013.01); *H04W 74/0808* (2013.01);
(Continued)

(58) Field of Classification Search
CPC ..... H04W 16/14; H04W 14/16; H04W 88/06; H04W 74/0808; H04W 88/10; H04W 76/02
See application file for complete search history.

(56) References Cited

U.S. PATENT DOCUMENTS 8,923,225 B2 * 12/2014 Sydor ................. H04W 72/082
370/329
2014/0199992 A1 * 7/2014 Chincholi ............ H04W 16/14
455/422.1
(Continued)

FOREIGN PATENT DOCUMENTS

WO      2012151284 A1    11/2012
WO   WO-2012151284 A1 * 11/2012 ............ H04W 16/14
(Continued)

OTHER PUBLICATIONS

3rd Generation Partnership Project, "Technical Specification Group Radio Access Network; Evolved Universal Terrestrial Radio Access (E-UTRA); Physical Channels and Modulation (Release 11)", 3GPP TS 36.211 V11.0.0, Sep. 2012, pp. 1-106.
(Continued)

*Primary Examiner* — Asghar H Bilgrami
(74) *Attorney, Agent, or Firm* — Sage Patent Group

(57) ABSTRACT

A technique for communicating on unlicensed spectrum is provided. As to a method aspect of the technique, a clear-channel assessment, CCA, is performed for the unlicensed spectrum. A result of the CCA indicates clearance of the unlicensed spectrum. A signal in the unlicensed spectrum is sent. The signal including a signature sequence (110) indicating that the unlicensed spectrum is used by a cellular radio-access technology. The communication on the unlicensed spectrum is in accordance with the cellular radio-access technology.

18 Claims, 10 Drawing Sheets

(51) Int. Cl.
*H04W 88/10* (2009.01)
*H04W 16/14* (2009.01)
*H04W 48/16* (2009.01)
*H04W 76/10* (2018.01)

(52) U.S. Cl.
CPC ........... *H04W 88/06* (2013.01); *H04W 88/10* (2013.01); *H04W 76/10* (2018.02)

(56) References Cited

U.S. PATENT DOCUMENTS

| | | | | |
|---|---|---|---|---|
| 2016/0127098 | A1* | 5/2016 | Ng | H04L 5/0048 370/329 |
| 2016/0234861 | A1* | 8/2016 | Ye | H04W 74/0808 |
| 2016/0278050 | A1* | 9/2016 | Nory | H04W 16/14 |
| 2016/0278118 | A1* | 9/2016 | Yerramalli | H04L 5/001 |
| 2016/0302076 | A1* | 10/2016 | Chou | H04W 16/14 |
| 2016/0302225 | A1* | 10/2016 | Damnjanovic | H04W 72/1284 |
| 2017/0245272 | A1* | 8/2017 | Li | H04W 72/0446 |
| 2017/0265248 | A1* | 9/2017 | Narasimha | H04W 52/0216 |
| 2017/0279565 | A1* | 9/2017 | Han | H04L 1/1887 |
| 2017/0318568 | A1* | 11/2017 | Nimbalker | H04L 5/0048 |

FOREIGN PATENT DOCUMENTS

| | | | | |
|---|---|---|---|---|
| WO | 2013131257 | A1 | 9/2013 | |
| WO | WO 2013131257 | A1 * | 9/2013 | ............ H04W 16/14 |
| WO | WO-2013131257 | A1 * | 9/2013 | ............ H04W 16/14 |

OTHER PUBLICATIONS

3rd Generation Partnership Project, "Technical Specification Group Radio Access Network; Evolved Universal Terrestrial Radio Access (E-UTRA); Physical layer procedures (Release 11)", 3GPP TS 36.213 V11.0.0, Sep. 2012, pp. 1-143.

European Telecommunications Standards Institute, "LTE; Evolved Universal Terrestrial Radio Access (E-UTRA); Radio Resource Control (RRC); Protocol specification (3GPP TS 36.331 version 12.3.0 Release 12)", ETSI TS 136 331 V12.3.0, Sep. 2014, pp. 1-383.

* cited by examiner

200

300

TECHNIQUE FOR COMMUNICATING ON UNLICENSED SPECTRUM

TECHNICAL FIELD

The present disclosure generally relates to a technique for communicating on unlicensed spectrum. More specifically, and without limitation, devices and methods are provided for communicating on unlicensed spectrum in the presence of other radio-access technologies.

BACKGROUND

Conventionally, the spectrum licensed by mobile carriers for cellular networks (e.g., Long-Term Evolution, LTE) and the unlicensed spectrum used for wireless local-area networks (WLANs) have been largely independent. As the number of mobile nodes and the data rates per mobile node increase, there has been a growing interest in smaller cells transmitting LTE channels in bands (or carriers) of the unlicensed spectrum.

Examples of unlicensed spectrum bands are the commonly-called "WiFi bands" around 2.4 GHz, 5 GHz and 60 GHz. These are free to use provided that certain regulatory constraints are fulfilled when transmitting on them. These bands are not dedicated to a specific radio-access technology (RAT).

Licensed-Assisted Access via LTE (LAA-LTE) has recently been proposed for LTE co-existence on unlicensed carriers with, e.g., WLAN. This means that a user equipment (UE) is connected to an LTE network on a licensed spectrum band, the so-called primary cell (P-cell). In addition, it can also be connected to the same network on an unlicensed spectrum, the secondary cell (S-cell).

Data transmission on an unlicensed band is to be controlled by a Listen-Before-Talk (LBT) mechanism, at least is some geographical regions. For example, an LBT mechanism may not be required in the United States in certain situations. Standards, e.g., future 3GPP standards for LAA-LTE, may require that an LBT mechanism is applicable to all regions. The LBT mechanism applies a functionality assessing the band to be clear before the transmission begins. This is necessary to avoid collisions, e.g. between WLAN and LTE networks, since there is no frame structure and no centralized synchronization governing the transmission in WLAN networks. Hence, any LTE transmitter must first listen to the channel for a stipulated time for energy detection before commencing transmission.

However, the first LTE node that "grabs" the channel blocks other LTE nodes in the neighborhood performing channel sensing.

SUMMARY

Accordingly, there is a need for a technique that allows utilizing unlicensed spectrum efficiently for communication, e.g., when shared between different RATs.

As to one aspect, a device for communicating on unlicensed spectrum is provided. The device includes one or more processors configured to trigger performing a clear-channel assessment (CCA) for the unlicensed spectrum, a result of the CCA indicating clearance of the unlicensed spectrum; sending a signal in the unlicensed spectrum, the signal including a signature sequence indicating that the unlicensed spectrum is used by a cellular radio-access technology (RAT); and communicating on the unlicensed spectrum according to the cellular RAT.

Based on the signature sequence indicating the cellular RAT occupying the unlicensed spectrum, nodes configured to operate according to the cellular RAT in the unlicensed spectrum do not block each other in at least some embodiments. A further communication of a further node using the indicated cellular RAT may commence without delay. E.g., the indicated cellular RAT can prevent that the communication is misinterpreted by the further node as a communication that blocks the unlicensed spectrum.

The communication may be scheduled by a scheduling mechanism of the indicated RAT. Based on the indicted RAT, more efficient scheduling mechanisms for the coexistence of nodes operating according to the cellular RAT may be applied in the unlicensed spectrum. By indicating that the unlicensed spectrum is used by the cellular RAT, the communication based on the indicated RAT may rely upon a scheduling mechanism provided by the cellular RAT for all nodes of the access network using the RAT. An LTE implementation can provide for an LTE access network the opportunity to off-load traffic into WiFi bands without having to pay additional licensing fees on top of those of the LTE spectrum.

The further node using the cellular RAT may determine based on the signature sequence that the channel is occupied by the indicated cellular RAT. Based on the indicated cellular RAT, the further node can rely upon the scheduling mechanism provided by the indicated cellular RAT, e.g., for coordinating the communication triggered by the device and a further communication of the further node.

The device may be implemented at or for an access node of the cellular RAT. E.g., the device may be implemented at or for a radio base station (RBS). Alternatively or in addition, the device may be implemented at or for a mobile node of the cellular RAT. E.g., the device may be implemented at or for a user equipment (UE). The RBS may provide wireless access to the UE.

The signature sequence may be configured to be detected by correlating the signal as received with the signature sequence. The signature sequence may be transmitted on dedicated resource elements. The signature sequence may differ in time and/or frequency from further signals that are sent in the unlicensed spectrum according to the indicated radio-access technology.

The unlicensed spectrum may include an unlicensed frequency band or an unlicensed carrier. The unlicensed spectrum may include one or more frequency bands at 2.4 GHz, 2.7 GHz, 5 GHz and 60 GHz, e.g. according to the Wi-Fi Alliance or wireless local-area network (WLAN) bands according to the standard family IEEE 802.11.

The communication may be based on carrier aggregation including one or more licensed spectrum bands and the one or more unlicensed spectrum bands. The one or more licensed spectrum bands may be in a frequency range of 400 MHz to 3.8 GHz, e.g., for an LTE radio-access network or higher for a 5G radio-access network optionally including up to 60 GHz.

The clearance of the unlicensed spectrum may be determined by measuring no energy on the unlicensed spectrum (e.g., except for noise power) or energy below a threshold.

The signature sequence may be indicative of at least one of a standard of the radio-access technology and an operator providing the radio-access technology. The radio-access technology may use a frame structure or a subframe structure. The communication may include sending padding data up until a subsequent frame boundary of the subframe structure or a subsequent subframe boundary of the subframe structure is reached.

The signature sequence may be sent regularly during the communication. The signature sequence may be sent before and after the subsequent subframe boundary.

A positive pseudo-random number may be generated. A plurality of CCAs may be performed. The generated number may be decremented for each CCA indicating a clear channel. A result of the decrementation less than 1 or 0 may be required for starting the communication. The generated pseudo-random number may be exchanged between at least a subset of nodes using the cellular radio-access technology in the unlicensed spectrum.

The signature sequence may uniquely identify at least one of a node communicating on the unlicensed spectrum and a radio-access network including the node. Alternatively or in addition, the signature sequence may be time-dependent.

As to another aspect, a device for communicating on unlicensed spectrum is provided. The device includes one or more processors configured to trigger receiving a signal in the unlicensed spectrum, the signal including a signature sequence indicating that the unlicensed spectrum is used by a cellular radio-access technology (RAT); performing a clear-channel assessment (CCA) based on the received signal, wherein the signature sequence is filtered out from the received signal, a result of the CCA indicating clearance of the unlicensed spectrum; and communicating on the unlicensed spectrum according to the cellular radio-access technology.

The device may be implemented at or for an access node of the cellular RAT. E.g., the device may be implemented at or for a radio base station (RBS). Alternatively or in addition, the device may be implemented at or for a mobile node of the cellular RAT. E.g., the device may be implemented at or for a user equipment (UE). The RBS may provide wireless access to the UEs.

An initial CCA may be performed based on the signal as received. A result of the initial CCA may indicate that the unlicensed spectrum is occupied. The signature sequence may be decoded from the received signal. The filtering may include estimating a component in the received signal based on the decoded signature sequence. The filtering may further comprise canceling the estimated component from the received signal. The CCA result may indicate clearance if no RAT other than the indicated RAT occupies the unlicensed spectrum.

The device according to the other aspect may further comprise functional units for performing any one of the functional features and steps disclosed in the context of the one aspect.

As to another aspect, a radio base station is provided. The radio base station includes any one of the devices, or a combination of both devices, according to the above aspects.

As to a further aspect, a method of communicating on unlicensed spectrum is provided. The method comprises triggering: a step of performing a clear-channel assessment (CCA) for the unlicensed spectrum, a result of the CCA indicating clearance of the unlicensed spectrum; a step of sending a signal in the unlicensed spectrum, the signal including a signature sequence indicating that the unlicensed spectrum is used by a cellular radio-access technology (RAT); and a step of communicating on the unlicensed spectrum according to the cellular RAT.

As to a still further aspect, a method of communicating on unlicensed spectrum is provided. The method comprises triggering: a step of receiving a signal in the unlicensed spectrum, the signal including a signature sequence indicating that the unlicensed spectrum is used by a cellular radio-access technology (RAT); a step of performing a clear-channel assessment (CCA) based on the received signal, wherein the signature sequence is filtered out from the received signal, a result of the CCA indicating clearance of the unlicensed spectrum; and a step of communicating on the unlicensed spectrum according to the cellular radio-access technology.

The method may further include any feature disclosed in the context of the device aspects. Particularly, the method may further comprise one or more of steps according to the operation of any one of the device aspects.

As to a further aspect, a computer program product is provided. The computer program product comprises program code portions for performing any one of the steps of the method aspects disclosed herein when the computer program product is executed by one or more computing devices. The computer program product may be stored on a computer-readable recording medium. The computer program product may also be provided for download via a data network, e.g., the mobile telecommunications network and/or the Internet.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a Long-Term Evolution (LTE) implementation, it is readily apparent that the technique described herein may also be implemented in any other wireless communication network, e.g., including the Global System for Mobile Communications (GSM, e.g., in the 900 MHz bands), the Universal Mobile Telecommunications System (UMTS) and the Worldwide Interoperability for Microwave Access (WiMAX) according to the standard family IEEE 802.16.

Moreover, those skilled in the art will appreciate that the services, functions, steps and units explained herein may be implemented using software functioning in conjunction with a programmed microprocessor, an Application-Specific Integrated Circuit (ASIC), a Field-Programmable Gate Array (FPGA), a Digital Signal Processor (DSP) or a general-purpose computer, e.g., including an Advanced RISC Machine (ARM). It will also be appreciated that, while the following embodiments are primarily described in context with methods and devices, the invention may also be embodied in a computer program product as well as in a system comprising a computer processor and memory coupled to the processor, wherein the memory is encoded with one or more programs that may perform the services, functions, steps and implement the units disclosed herein.

A radio-access network 100 for implementing the technique includes at least one signature sequence transmitting node and at least one signature sequence receiving node, which are generally referred to by reference signs 102 and 103, respectively.

The nodes may be realized in combination or separately. Each of the nodes may be realized by a radio base station (RBS) and/or a user equipment (UE).

Figure 1:
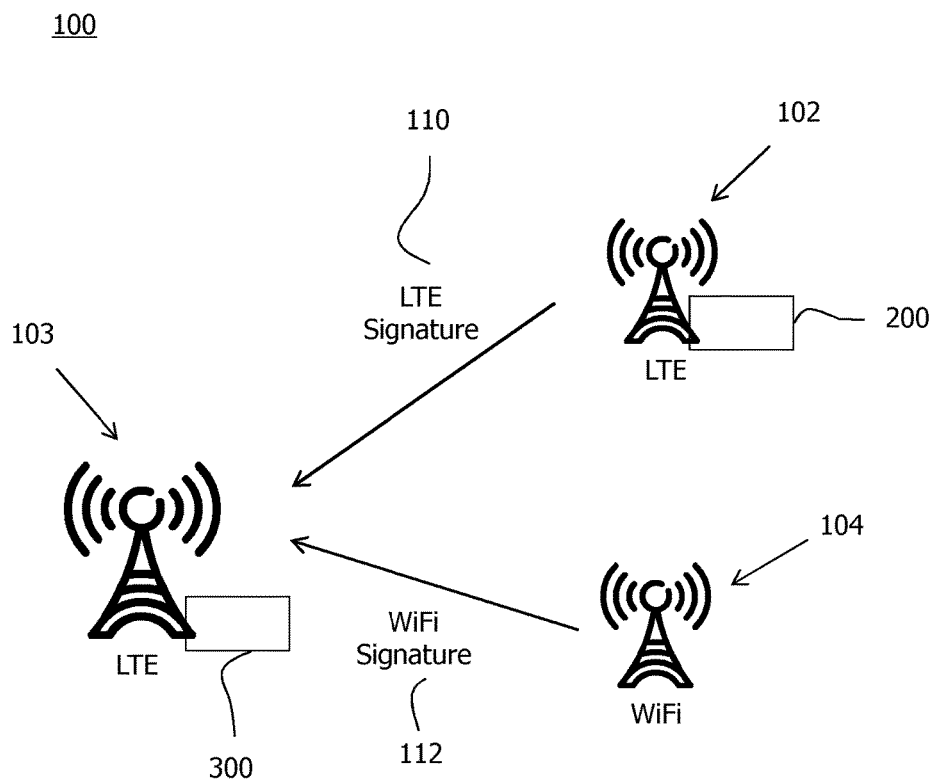
FIG. 1 schematically illustrates an exemplary radio-network environment including radio base stations.

FIG. 1 schematically illustrates a radio-access network 100 as an exemplary environment for implementing the technique. The radio-access network 100 includes RBSs 102 and 103, as examples for the signature sequence transmitting node and the signature sequence receiving node, respectively.

The RBSs 102 and 103 are configured to provide access to UEs according to a cellular radio-access technology (RAT) in a licensed spectrum (or on a licensed carrier) and to selectively provide access to the UEs according to the cellular RAT in an unlicensed spectrum (or on an unlicensed carrier). If transmitting in the unlicensed spectrum, each of the RBSs 102 and 103 of the radio-access network 100 sends a signature sequence 110 indicating the cellular RAT. Sending the signature sequence 110 is illustrated for the RBS 102 in FIG. 1.

A further station 104, which is not necessarily a node of the radio-access network 100, provides radio access in the unlicensed spectrum (or on the unlicensed carrier). The station 104 may be configured for operating exclusively in the unlicensed spectrum. Optionally, the station 104 sends a signature sequence 112 indicating a non-cellular RAT. The station 104 may provide access according to the non-cellular RAT to UEs (e.g., mobile or portable stations) that may be (at least partly) identical or distinct from those UEs accessing the RBS 102 and/or the RBS 103.

Each of the RBSs 102 and 103 may be implemented by an Evolved Node B (eNB) according to the Long-Term Evolution (LTE) or LTE Advanced. The station 104 may be an access point for a Wireless Local-Area Network (WLAN) according to the standard family IEEE 802.11 (e.g., IEEE 802.11a, ah, g, n, ac and ad).

The RBSs 102 and 103 may be examples out of a plurality of RBSs of the radio-access network 100. The RBSs 102 and 103 may be located in homes, in offices, on lamp posts, etc.

Figure 2:
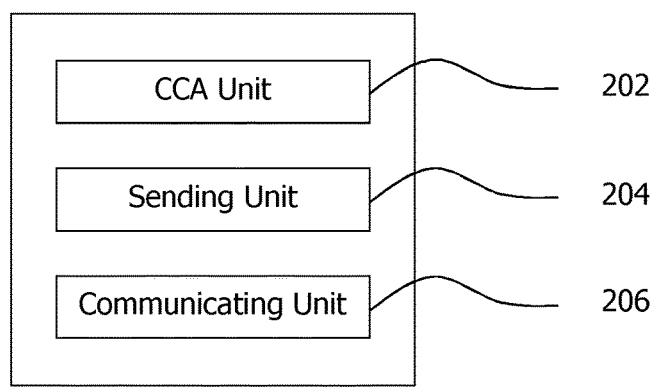
FIG. 2 schematically illustrates a block diagram of a device for communicating on unlicensed spectrum, which is implementable at any one of the radio base stations of FIG. 1.

FIG. 2 schematically illustrates a block diagram of device 200 for communicating on unlicensed spectrum. The device 200 may be located at the RBS 102.

The device 200 comprises a clear-channel assessment (CCA) unit 202 configured to perform one or more CCAs on the unlicensed spectrum, e.g., for a Listen-Before-Talk (LBT) mechanism. The device 200 further comprises a sending unit 204 configured to send a signal including a signature sequence on the unlicensed spectrum. The signature sequence indicates that a channel in the unlicensed spectrum is occupied by a cellular RAT. A communicating unit 206 is configured to communicate on the channel in the unlicensed spectrum according to the cellular RAT. The sending unit 204 may be included in the communicating unit 206. The communicating unit 206 may provide the functionality of the sending unit 204 and a receiving unit.

Figure 3:
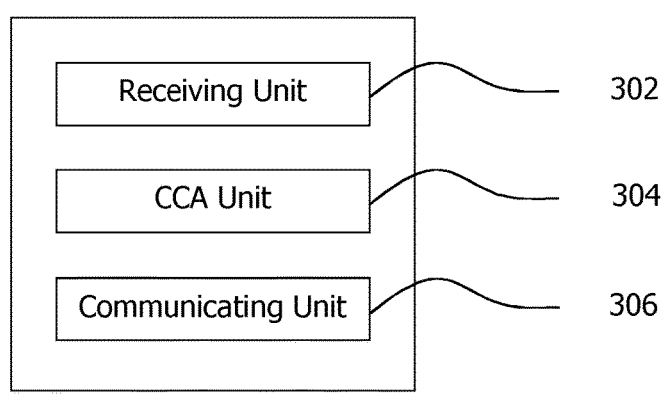
FIG. 3 schematically illustrates a block diagram of a device for communicating on unlicensed spectrum, which is implementable at the same or another one of the radio base stations of FIG. 1.

FIG. 3 schematically illustrates a block diagram of device 300 for communicating on unlicensed spectrum. The device 300 may be located at the RBS 103.

The device 300 comprises a receiving unit 302 configured to receive a signal including a signature sequence on the unlicensed spectrum. The signature sequence indicates that a channel in the unlicensed spectrum is occupied by a cellular RAT. The device 300 further comprises a CCA unit 304 configured to perform one or more CCAs on the unlicensed spectrum, e.g., for an LBT mechanism. The CCA unit 304 is based on the signal and accounts for the signature sequence. A communicating unit 306 is configured to communicate on the channel in the unlicensed spectrum according to the cellular RAT. The receiving unit 302 may be included in the communicating unit 306. The communicating unit 306 may provide the functionality of the receiving unit 302 and a sending unit.

Each of the devices 200 and 300 may be combined or may be extended to comprise the units of the other device. E.g., the communicating unit 206 may include both the receiving unit 302 and the sending unit 204. The CCA unit 202 may account for the signature sequence, e.g., if a CCA indicates that the channel is not clear and the signature sequence has been received by the receiving unit 302.

Alternatively or in addition, the communicating unit 306 may include both the receiving unit 302 and the sending unit 204. The sending unit 204 may send the signature sequence, e.g., if a CCA indicates that the channel is clear.

Figure 4:
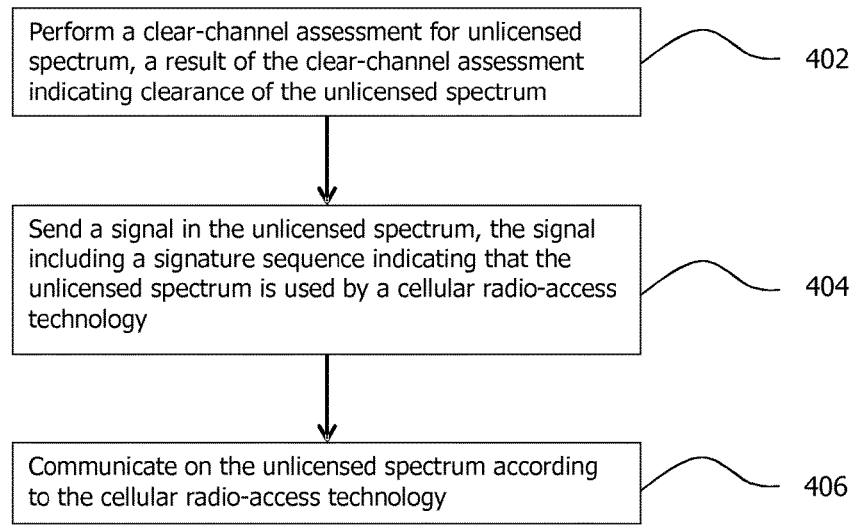
FIG. 4 shows a flowchart for a method of communicating on unlicensed spectrum, which is implementable by the device of FIG. 2.

FIG. 4 shows a flowchart for a method 400 of communicating on unlicensed spectrum. In a step 402, at least one CCA is performed for a channel of the unlicensed spectrum. If a result of the CCA indicates that the channel in the unlicensed spectrum is clear, a signal is sent on the channel in the unlicensed spectrum in a step 404 of the method 400. The signal includes a signature sequence indicating that the channel in the unlicensed spectrum is used by a cellular RAT. A communication is started using the channel in the unlicensed spectrum according to the cellular RAT in a step 406.

The steps 404 and 406 may involve the same transmitter or the same transceiver. The steps 404 and 406 may be performed simultaneously and/or within the same subframe. By way of example, the step 406 may include a data transmission that also includes the signature sequence according to the step 404. E.g., the signal may include both data and the signature sequence. Data and signature sequence may be separate in the signal, e.g., separate by time and/or frequency. The signature sequence may provide the functionality of a RAT-specific label for the signal. In an advanced implementation, the data may be signed using the signature sequence, e.g., by encrypting a hash value of the data using a private key that is associated with the signature sequence as a public key.

The steps 402, 404 and 406 may be performed by the functional units 202, 204, 206, respectively.

Figure 5:
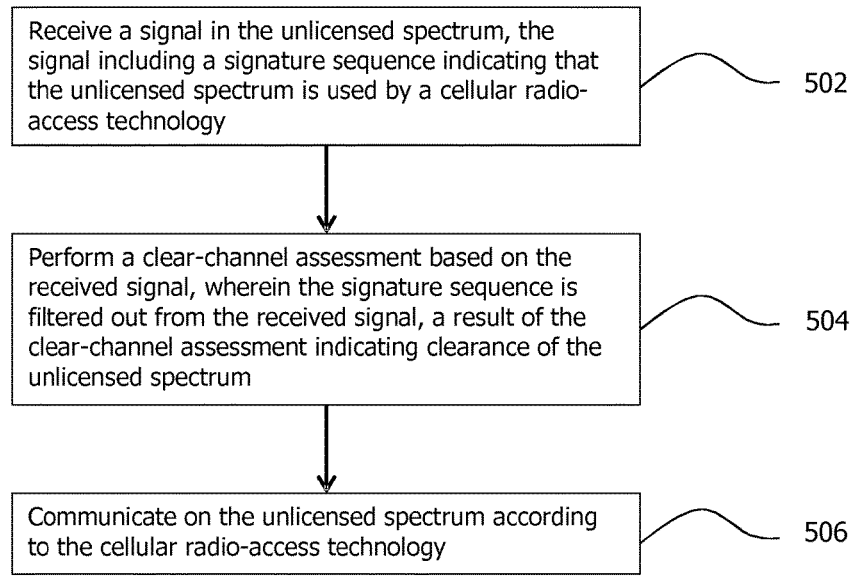
FIG. 5 shows a flowchart for a method of communicating on unlicensed spectrum, which is implementable by the device of FIG. 3.

FIG. 5 shows a flowchart for a method 500 of communicating on unlicensed spectrum. In a step 502, a signal in the unlicensed spectrum is received. The signal includes a signature sequence indicating that the unlicensed spectrum is used by a cellular RAT. The mere presence of the signature sequence 110 in the signal may indicate that the channel is occupied from the perspective of the device 200. The signature sequence may be sent by a node (e.g., an eNB) of a network using the cellular RAT (e.g., LTE). At least at the time of signal reception, e.g. within a specific Resource Element (RE), the signature sequence may be the only signal sent by the node of the cellular network. The received signal may include further signal components, e.g., from a station of a non-cellular network or a node not using the same cellular RAT.

The signature sequence is filtered out from the received signal. At least one CCA is performed based on the filtered signal in a step 504. If a result of the CCA indicates that the channel in the unlicensed spectrum is clear, a communication on the channel in the unlicensed spectrum is started according to the cellular RAT in a step 506. The filtering may allow detecting hidden nodes or stations.

The steps 502 and 506 may involve the same receiver or the same transceiver. The step 506 may further include the step 404 of sending the signature sequence. The steps 404 and 506 may be performed simultaneously and/or within the same subframe. By way of example, the step 506 may include a data transmission that also includes the signature sequence according to the step 404. In an advanced implementation, the data may be signed using the signature sequence, e.g., by encrypting a hash value of the data using a private key that is associated with the signature sequence as a public key.

The steps 502, 504 and 506 may be performed by the functional units 302, 304, 306, respectively.

In an exemplary LTE implementation, an LTE signature sequence is transmitted according to the step 404 when occupying the channel. The signature sequence is recognizable (e.g., decodable) by all LTE nodes within range of radio reception. The signature sequence enables the LTE nodes to determine that the channel is occupied by another LTE node, and hence, regular LTE scheduling for multiple users can be employed.

So-called Licensed-Assisted Access via LTE (LAA-LTE) has recently been proposed for LTE co-existence on unlicensed carriers with, e.g., WLAN. According to LAA-LTE, a UE is connected to an LTE access network 100 on a licensed spectrum band, the so-called Primary cell (P-cell). In addition, the UE can also be connected to the same radio-access network 100 on an unlicensed spectrum, the S-cell (Secondary cell). There may be more than one S-cell, i.e., more than one carrier in the unlicensed spectrum.

Figure 6:
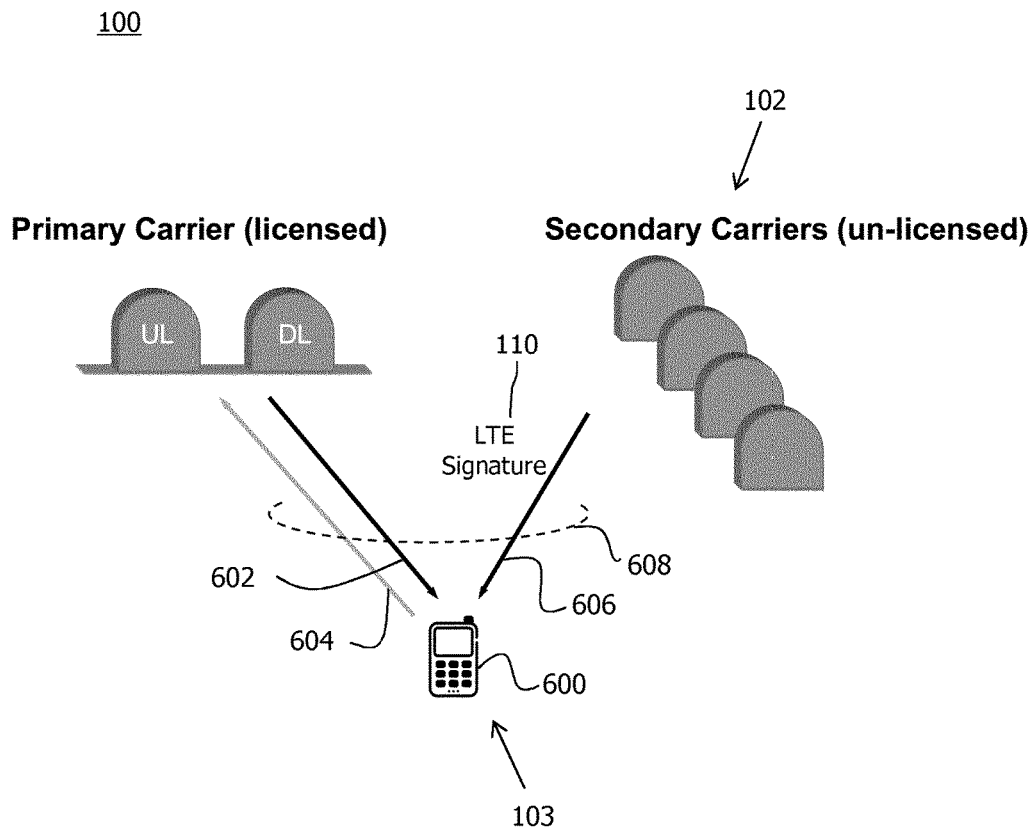
FIG. 6 schematically illustrates a first embodiment of a communication including a radio base station operated in the unlicensed spectrum.

FIG. 6 shows a first embodiment for the communication according to the steps 406 and 506 performed or triggered by the devices 200 and 300, respectively.

An RBS implements the P-cell. The P-cell RBS provides to a UE 600 a first downlink channel 602 and an uplink channel 604. The channel 602 and 604 are in the licensed spectrum (which is also referred to as a primary carrier). A further RBS implements the S-cell. The S-cell RBS provides a second downlink channel 606. The second downlink channel 606 is in the unlicensed spectrum (which is also referred to as secondary carrier). The signature sequence 110 is exchanged according to the steps 404 and 502 on the second downlink channel 606.

The first downlink channel 602 and the second downlink channel 606 are aggregated. Inter-band carrier aggregation is indicated at reference sign 608.

RBSs and UEs of the radio-access network 100 are collectively referred to as nodes. Nodes 102 and 103 implement one of the S-cells in each case. The nodes 102 and 103 are controlled by the devices 200 and 300, respectively. Optionally, any one of the nodes 102 and 103 additionally implements the P-cell.

In the embodiment of the radio-access network 100 illustrated in FIG. 1, the RBSs 102 and 103 implement the nodes 102 and 103, respectively. In a variant of the embodiment of FIG. 1, the radio-access network 100 includes the RBSs 102 and 103 in communication with the UE 600 implementing the method 500 (i.e., the UE 600 is a further embodiment of the node 103).

In the embodiment of the radio-access network 100 illustrated in FIG. 6, the S-cell RBS and the UE implement the nodes 102 and 103, respectively. At least the reception on the downlink channel 606 is controlled by the method 500 performed by the UE 600. In an advanced embodiment of the UE 600, the UE 600 initiates occupying the uplink channel 606 in the unlicensed spectrum by performing the method 400 (i.e., the UE 600 implements the node 102).

The technique is applicable to an LAA-LTE system according to FIG. 6. Any LTE node 102 that transmits on a channel in the unlicensed spectrum sends an LTE signature sequence 110 according to the step 404, which enables other LTE nodes 103 to determine according to the step 502 that the channel is being used by another LTE node 102. Hence, regular scheduling mechanisms available in the LTE access network 100 can be used to share the channel among the LTE nodes 102 and 103.

The CCA may also be referred to as channel sensing. A CCA period is, e.g., 20 µs in the WiFi bands according to IEEE 802.11-2007, but proposed to be shortened to, e.g., 18 µs. If no signal energy above a specified threshold is detected in the received signal, the CCA result indicates the clearance of the channel (which may also be referred to as a "channel free" result). Otherwise, the CCA result indicates that the channel is occupied (which may also be referred to as a "channel busy" result).

In response to a clearance result, the transmitter has a maximum response time (e.g., about 15 µs) to have its own transmission started. If the transmitter were to take longer than the CCA period (e.g., longer than 18 µs or 20 µs), another node or station could potentially fit its CCA period in that time window and find the channel to be clear. This would lead to a first type of collision, which is avoided by observing the maximum response time.

An extended CCA mechanism mitigates a second type of collision, as described in what follows. The second type encompasses coincidental transmissions (which can coincide with the first collision type). A frequency of the second collision type depends on the number of nodes or stations potentially transmitting in the unlicensed band. Such collisions can be more frequent for WiFi stations (e.g. the stationary WiFi station 104 or the UE 600 further configured to selectively operate as a mobile WiFi station). By way of example, WiFi stations do not only perform energy detection but also decode packet headers of received WiFi transmissions. Each WiFi station thus has information as to when the current transmission will end. Consequently, the WiFi stations tend to get synchronized by scheduling their channel sensing at the same time, namely, when the current WiFi transmission ends.

According to the extended CCA, each node wanting to transmit generates a pseudo-random integer N, wherein N is in the range [1, . . . , M]. The range parameter M is fixed for each node 102 and 103 or for the entire radio-access network 100. The range parameter M may depend on a region of the world the node operates in. Typically, the range parameter M varies between 4 and 32. Alternatively or in addition, the range parameter M depends on a maximum allowed channel occupancy time. The extended CCA procedure specifies that a node wanting to transmit first performs one CCA. If the CCA returns "busy", a further CCA must be performed.

If the CCA returns "free", the value of N, which was randomly generated by this particular node, is decreased by one. If N=0 and a further current CCA indicates "free", the transmission is started. Otherwise, the process continues by periodically performing CCAs until N=0 is reached. The extended CCA mechanism leads to a random back-off behavior among the nodes and, thus, resolves collisions.

Figure 10:
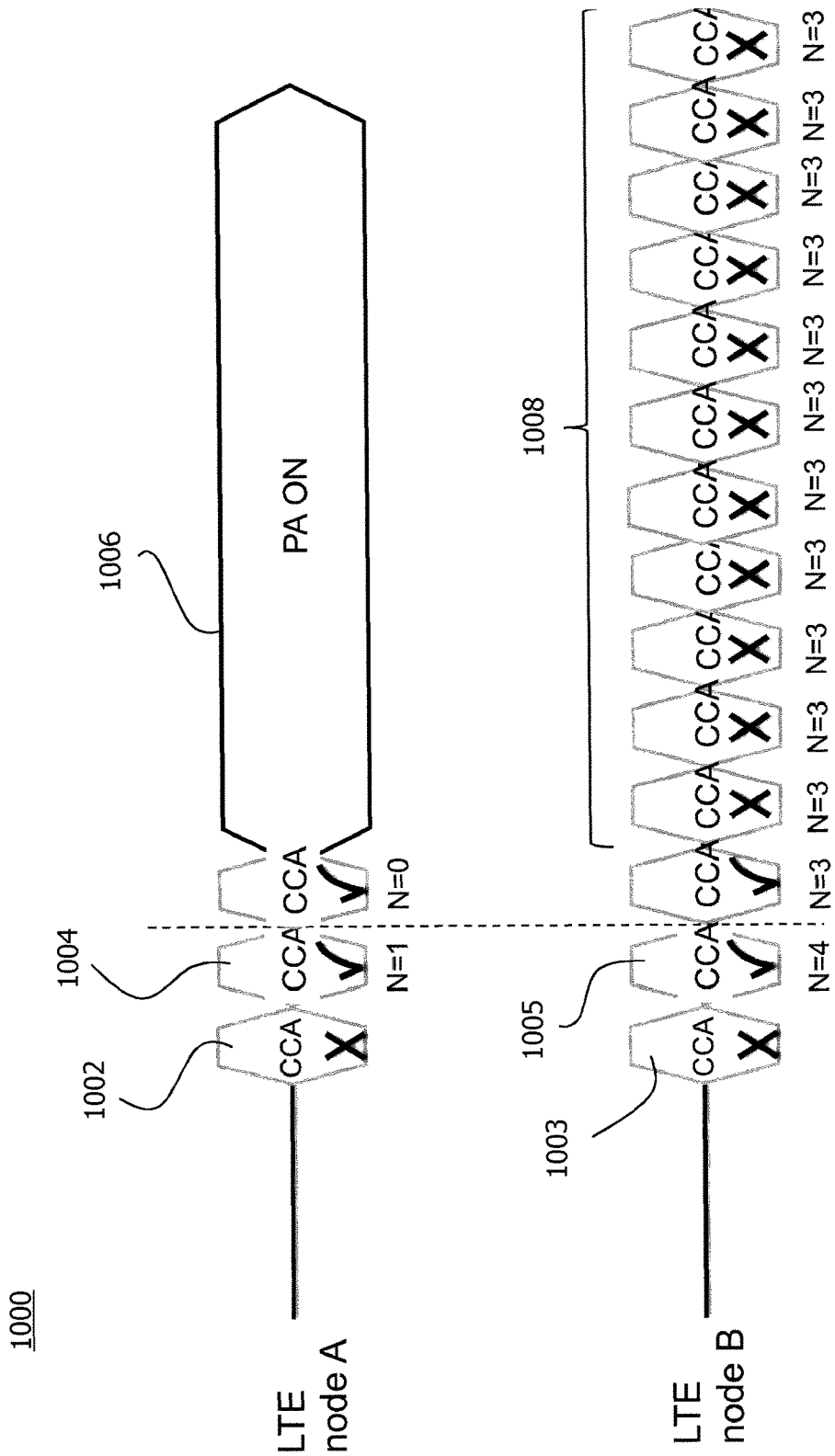
FIG. 10 schematically illustrates a reference example for a communication including a radio base station operated in the unlicensed spectrum.

FIG. 10 schematically illustrates a conventional co-existence operation 1000 as a reference example. Time increases from the left to the right. Each of the LTE nodes A and B receives an active WiFi station, so that first CCAs 1002 and 1003 indicate that the channel is occupied, respectively.

The WiFi station is inactive at later CCAs 1004 and 1005 performed by the LTE nodes A and B, respectively. The LTE node A has generated the random number N=1, so that the positive result of the CCA 1004 decrements N to 0. The LTE node A thus enables its power amplifier (PA) for a transmission 1006.

If the LBT procedure is not synchronized across LTE nodes, i.e., the LTE nodes A and B employ different initial random values for the back-off parameter N, the LTE node A with the smallest N occupies the channel by starting the transmission 1006. The power that the LTE node A transmits is detected by the other LTE node B, which declares the channel busy in the further CCAs required by its back-off parameter N being greater than 0. This is illustrated in FIG. 10 at reference sign 1008. As long as the LTE node B senses energy from the LTE node A, the LBT for the LTE node B does not succeed.

Figure 7:
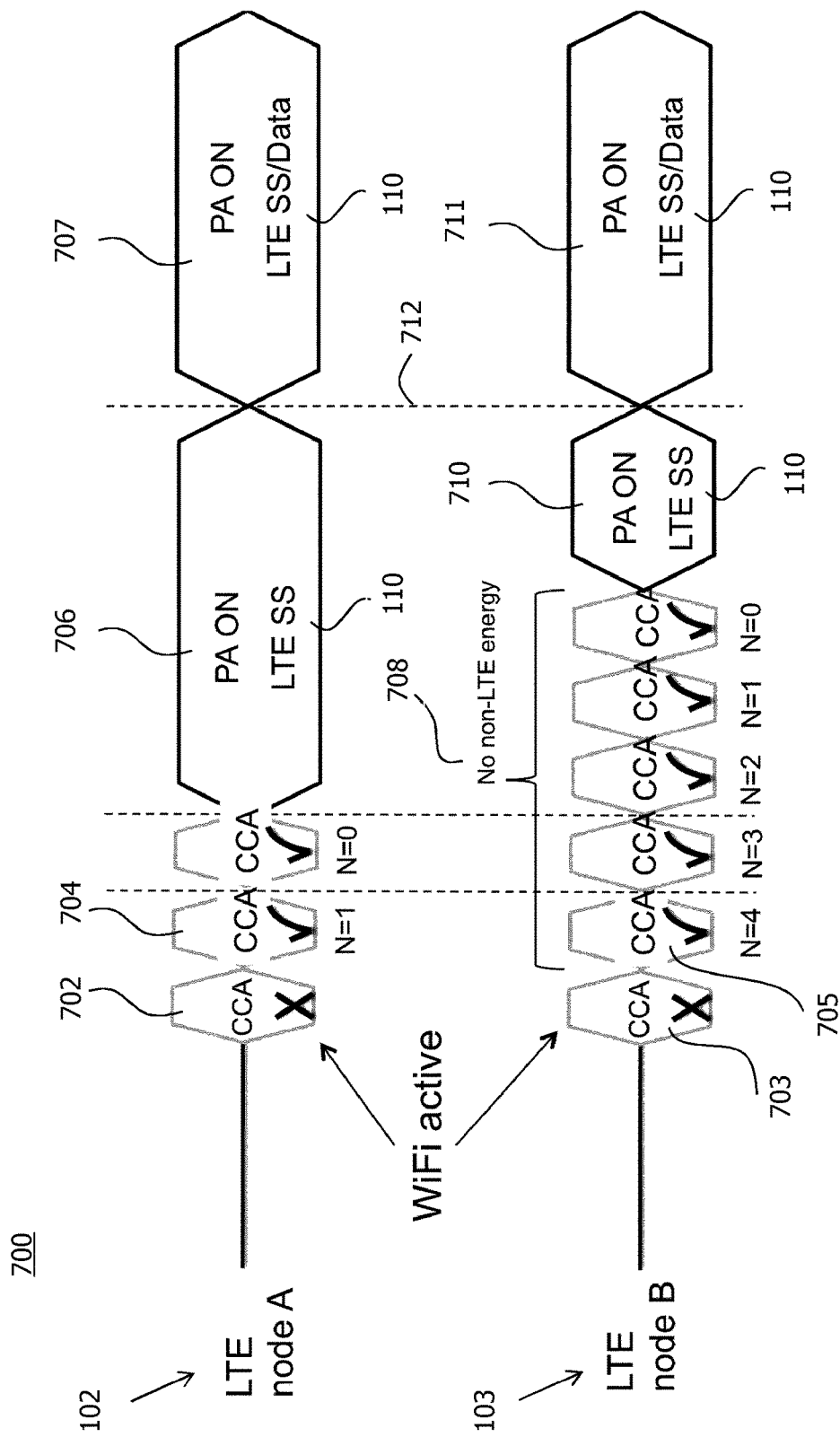
FIG. 7 schematically illustrates a second embodiment of a communication including a radio base station operated in the unlicensed spectrum.

FIG. 7 schematically illustrates a second embodiment of a communication 700 involving at least two LTE nodes 102 and 103 each configured to operate in an unlicensed spectrum. The signature sequence 110 indicative of LTE as the cellular RAT is abbreviated by "LTE SS" in FIG. 7. The at least two nodes 102 and 103 are in range of mutual radio reception.

In a first implementation, each of the at least two nodes 102 and 103 includes an S-cell RBS (e.g., according to FIG. 1). E.g., the node 102 and/or the node 103 may be implemented by an RBS configured to operate in both the licensed spectrum and the unlicensed spectrum. I.e., one P-cell and one or more S-cells may be co-located at the node 102 and/or the node 103. Alternatively, each of the S-cell RBSs 102 and 103 provides carrier aggregation in cooperation with a physically separate P-cell RBS. The P-cell RBS cooperating with the S-cell RBS 102 and the P-cell RBS cooperating with the S-cell RBS 103 may be identical or may be different.

In a second implementation (that is combinable with the first implementation), the nodes 102 and 103 may include at least one S-cell RBS and at least one UE (e.g., according to the first communication embodiment of FIG. 6), respectively or vice versa. The UE 600 may operate in both the licensed and the unlicensed spectrum.

An operation of the node 102 controlled by the method 200 is illustrated in the upper half of FIG. 7. An operation of the node 103 controlled by the method 300 is illustrated in the lower half of FIG. 7. CCAs 702 and 703 performed by the nodes 102 and 103, respectively, indicate that the channel is occupied. E.g., a WiFi station 104, within range of radio communication for both of the nodes 102 and 103, is active during the CCA period.

The technique is applicable without the LBT procedures of the different LTE nodes 102 and 103 being synchronized, i.e., the random back-off parameter N may be generated independently at each node. In the example depicted in FIG. 7, the nodes 102 and 103 generate the back-off parameter N=1 and N=4, respectively.

Consequently, in this example, LTE node 102 occupies the channel when its extended CCA procedure 704 declares the channel free according to the step 402. Occupying the channel includes sending the signature sequence 110 according to the step 404 (and optionally also another signal) with enough energy to ensure that the energy is detected on the channel as busy by the other node 103 as well as WiFi stations, e.g., the WiFi station 104, which is illustrated for a time period 706.

The other signal sent in the time period 706 may include random padding data, LTE reference signals (that are also referred to as pilot signals) or other data. A function of the other signal is to generate enough energy in the unlicensed spectrum so that the WiFi stations detect the channel as busy. The LTE access network 100 occupies the channel and holds the channel busy until the next subframe boundary 712, at which time any LTE node of the LTE access network 100 can begin data transmission, e.g., the LTE node 102 according to the step 406, which is illustrated for a time period 707.

The at least one other LTE node 103 decodes the signature sequence 110 and determines according to the step 502 that it is another LTE node 102 that is occupying the channel, which is shown for a time period 708.

The at least one other LTE node 103 filters out the LTE signature sequence 110, e.g., in order to determine whether the received signal further includes energy from one or more WiFi transmissions. E.g., there could potentially be a hidden WiFi station, i.e., a WiFi station that the LTE node 102 cannot receive or which energy is below the threshold from the perspective of the node 102.

The hidden node generally refers to a situation, in which nodes A and B can "hear" each other's transmissions, but only node A can hear node C. Node B cannot hear node C. Hence, the situation serves to illustrate that channel sensing has to be done by the actual node wishing to transmit. E.g., no other node located nearby can do the channel sensing "on commission". In the example, the channel sensing by node B cannot replace the channel sensing by node A, since node B cannot determine the transmission status of node C.

In an implementation of the filtering, the signal $r_{recv}$, as received in the step 502, may be represented by $$r_{recv} = s_{seq."LTE"} + s_{seq."WiFi"} + n.$$

Based on the decoded signature sequence 110, an estimate $s_{est.seq."LTE"}$ for the contribution $s_{seq."LTE"}$ of the signature sequence 110 in the received signal $r_{recv}$ is computed, e.g., based on a channel estimation.

The estimate is canceled from the received signal, resulting in a filtered signal:

$$r_{CCA} = r_{recv} - s_{est.seq."LTE"}.$$

The CCAs 705 in the time period 708 are based on the filtered signal $r_{CCA}$ according to the step 504.

If the at least one other LTE node 103 finds the channel to contain only an LTE transmission, as illustrated at reference sign 705, the LTE node 103 may begin to transmit the same or a node-specific signature sequence 110 (and optionally another signal) to occupy the channel in the step 506, which is illustrated for a time period 710.

Filtering out the LTE signature sequence 110 may be done in several ways. In a first implementation of the step 504, e.g. due to the time-critical nature of the step method 500, the received signal is filtered prior to any FFT processing in an OFDM receiver at the LTE node 103. For example, using a RAKE receiver, the LTE node 103 estimates a delay spread of the channel, and hence, computes the estimate $s_{est.seq."LTE"}$ of the multi-path LTE signature sequence 110.

In a second implementation (which is combinable with the first implementation), the signature sequence 110 is continuous-phase modulated, e.g. by minimum-shift keying (MSK) or by Gaussian minimum-shift keying (GMSK, e.g. used in GSM), in order to mitigate detection errors due to phase-discontinuities in the estimated signature-sequence signal.

Preferably, the signature sequence 110 is transmitted continuously or periodically by an LTE node (e.g., the nodes 102 and 103) when using the channel according to the step 406 or 506, e.g., during both initial "channel-grabbing" periods 706 or 710 and during regular data transmission 707 and 711.

Each of the at least one LTE node 103 may not exclusively rely upon the reception of the LTE signature sequence 110 for triggering the communication 506, e.g. because a hidden WiFi station may coincidentally start transmitting. By way of example, the LTE node 103 performs the extended CCA based on the received and filtered signal in the time period 708.

In contrast to the reference example for a conventional transmission 1006, the LTE node 103 is not blocked by the transmissions 706 and 707 of the LTE node 102. Rather, the extended CCA is successfully completed within the time period 708.

The technique may be combined with a synchronized LBT procedure. The random back-off parameter N (which is generated for the number of back-offs in the extended CCA procedure) is synchronized (e.g., exchanged in the licensed spectrum) over the radio-access network 100. Furthermore, the LTE nodes 102 and 103 are synchronized in time. All LTE nodes in the LTE access network 100 agree on the subframe boundaries 712. Hence, the CCA periods may be synchronized to start simultaneously, e.g., at the subframe boundary 712. If N has the same value for all LTE nodes performing the extended CCA according to the step 402 or the step 504, the LTE nodes all reach the end of the last CCA period at the same time and declare the channel as free, if there is no (e.g., hidden) WiFi traffic. It is then the task of an LTE scheduler to coordinate the LTE transmissions by the LTE nodes for simultaneous use of the unlicensed spectrum.

The "grabbing" 706 and 710 of the unlicensed band according to the sending step 404 and the communicating step 506 further including sending a signature sequence is described for a radio-access network with synchronized frame structure.

The transmissions on the WiFi bands are asynchronous, i.e., a transmission may start anytime (provided that the LBT procedure has been followed). There is no reference to a centralized timing or frame structure. In the LTE access network 100, all transmissions are strictly synchronized to radio frames and subframes. The subframe is 1 ms in duration. The LTE scheduler located in the eNB schedules transmissions on a per-subframe basis. Hence, the data transmissions 707 and 711 start at the beginning 712 of the subframe. This presents a problem in the co-existence scenario with WiFi, since any node wanting to transmit must have started transmitting data within the maximum response time (e.g., 15 µs) after detecting a clear channel. Otherwise some other transmitter may occupy the same channel.

One way to solve this for the LTE access network 100 is to transmit padding data up until the next subframe boundary 712, at which the data transmission 707 and 711 can commence. The padding data can basically be any data that transmits energy on the channel to be occupied. Transmitting the padding data in the time periods 706 and 710 allows maintaining the subframe structure of the LTE access network 100.

Figure 8:
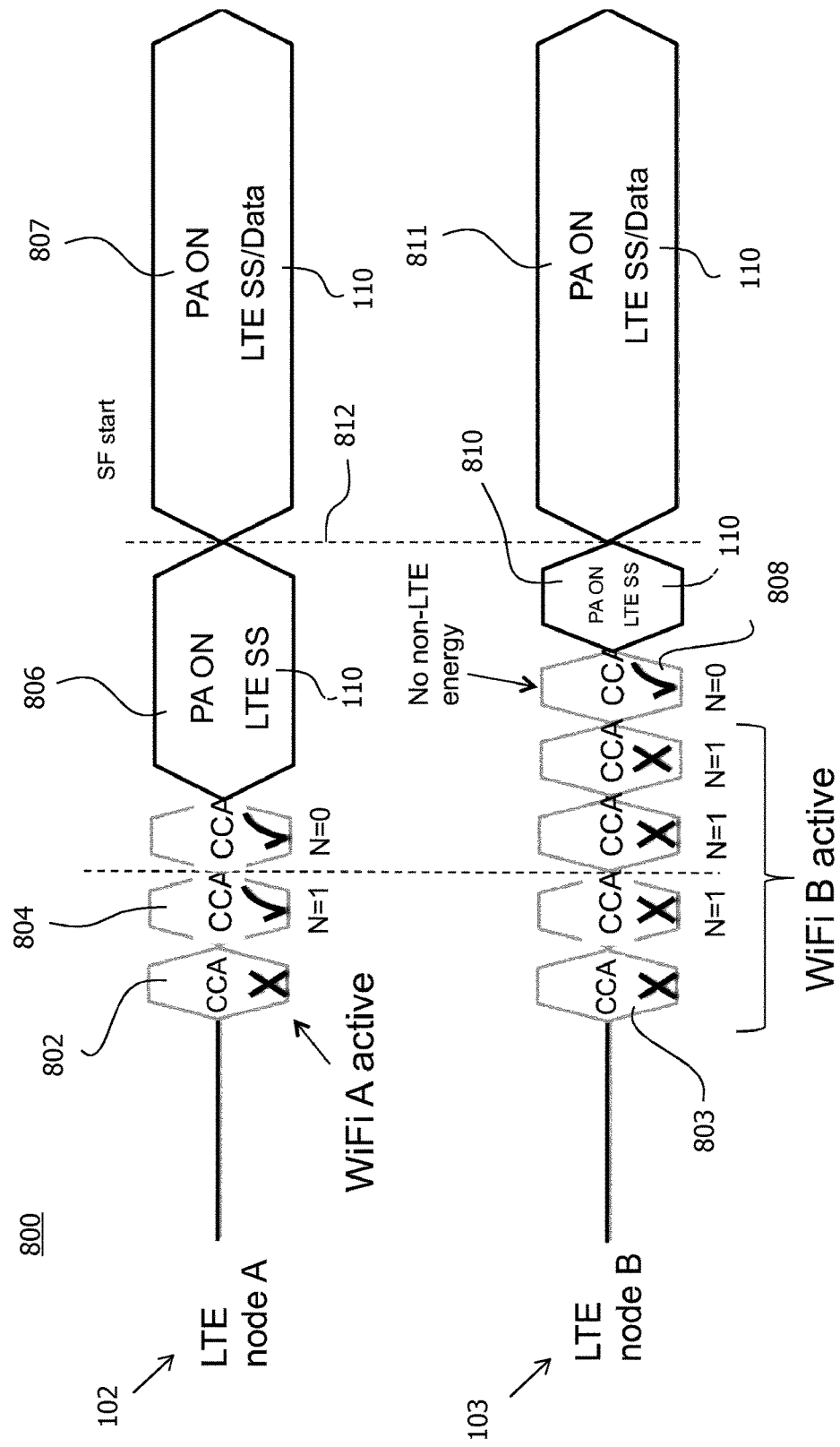
FIG. 8 schematically illustrates a third embodiment of a communication including a radio base station operated in the unlicensed spectrum.

FIG. 8 schematically illustrates a third embodiment of a communication 800 involving at least two LTE nodes 102 and 103. Like reference signs ("7xy" and "8xy") indicate features corresponding to those described with reference to the communication 700.

The communication 800 results from nodes 102 and 103 controlled by the methods 400 and 500, respectively, with a synchronized back-off parameter N. In addition to the WiFi station A, a hidden WiFi station B is present. LTE nodes 102 and 103 can "hear" each other. The WiFi station A can be sensed by both LTE nodes 102 and 103. The WiFi station B is hidden from the LTE node 102. Only the LTE node 103 senses the WiFi station B.

When the LTE node 102 has counted down the number of successful CCAs 804 from the common initial value of the back-off parameter N, the LTE node 102 begins transmitting in a signature sequence interval 806. The LTE node 103 still senses the WiFi station B and cannot decrease its value of the back-off parameter N. When the WiFi station B becomes inactive, the LTE node 103 continues sensing power above the threshold on the channel in the CCA period 808, but now from the LTE node 102, which has already begun transmitting in the time period 806. Hence, a synchronized LBT procedure alone does not solve the hidden node problem.

In the embodiment illustrated in FIG. 8, the LTE node 102 sends the signature sequence 110 that all LTE nodes transmit according to the step 404, e.g., embedded in its transmission 806. The signature sequence 110 is easily recognizable by all other LTE nodes 103 such that they determine that this transmitter is an LTE node. With this ability among all LTE nodes of the LTE access network 100, they can deduce that the LTE access network 100 is currently occupying the channel in the unlicensed spectrum. Hence, the channel can be shared using regular LTE multi-user techniques.

In all embodiments of a radio-access network 100 comprising RBSs belonging to the same network, the radio-access network 100 optionally further comprises a centralized scheduler configured to control several or all of the RBSs. Based on the centralized scheduler, all scheduler-controlled RBSs can transmit at the same time using LTE-internal channel-sharing mechanisms.

The node 102 may include a generator for generating the signature sequence 110. The generator may be configured to generate a sequence that has low cross-correlation and/or auto-correlation, that is detectable with low complexity, and/or that can be generated in various lengths, etc. In any one of the embodiments, the signature sequence 110 may be an existing sequence, e.g., defined in the LTE standard. Existing sequences are defined, e.g., in document 3GPP TS 36.211 (e.g., V12.4.0). Alternatively or in addition, the signature sequence is defined dedicatedly for identifying the cellular RAT (e.g., LTE) in the unlicensed spectrum.

The signature sequence 110 sent in the steps 404 and 506 may be the same for all nodes in the radio-access network 100. Alternatively, at least a subset of the nodes in the radio-access network 100 uses unique signature sequences.

Alternatively or in addition, subsets of nodes may be distinguished by different signature sequences. If several LTE operators co-exist on the unlicensed carrier, an embodiment uses different LTE signature sequences for the different access networks (regardless whether or not the different access networks provide for seamless handover) so that nodes of the access network of a first operator sense if the access network of a second operator has occupied the channel.

In a further embodiment, a first group of LTE nodes within the LTE access network 100 is configured to use a first LTE signature sequence, and a second group of LTE nodes within same LTE access network are configured to use a second LTE signature sequence. This enables that one group of LTE nodes jointly occupies the channel, e.g., while the LTE nodes of another group will not occupy the channel simultaneously, or define a spatially divided channel.

In any embodiment, the signature sequence may be constant in time (e.g., the same in all subframes), or the signature sequence is varying over time (e.g., depending on a subframe number).

In some embodiments, filtering out the signature sequence 110 by the node 103 in real-time causes a delay in the CCA step 504. When the node 102 sends out the signature sequence 110, the node 103 detects the signature sequence 110 and computes the estimate to be canceled from the received signal.

The process of performing detection and computing the estimate may not be possible to do within a specified latency (also referred to as a latency budget). In at least some embodiments, the delay is transient. E.g., the delay is only initially present when the node 102 starts to send the signal including the signature sequence 110 in the step 404. Once the node 103 has detected the signature sequence 110 and computed the estimate, the node 103 reuses the signature sequence, and optionally the estimate, for the next CCA period.

Figure 9:
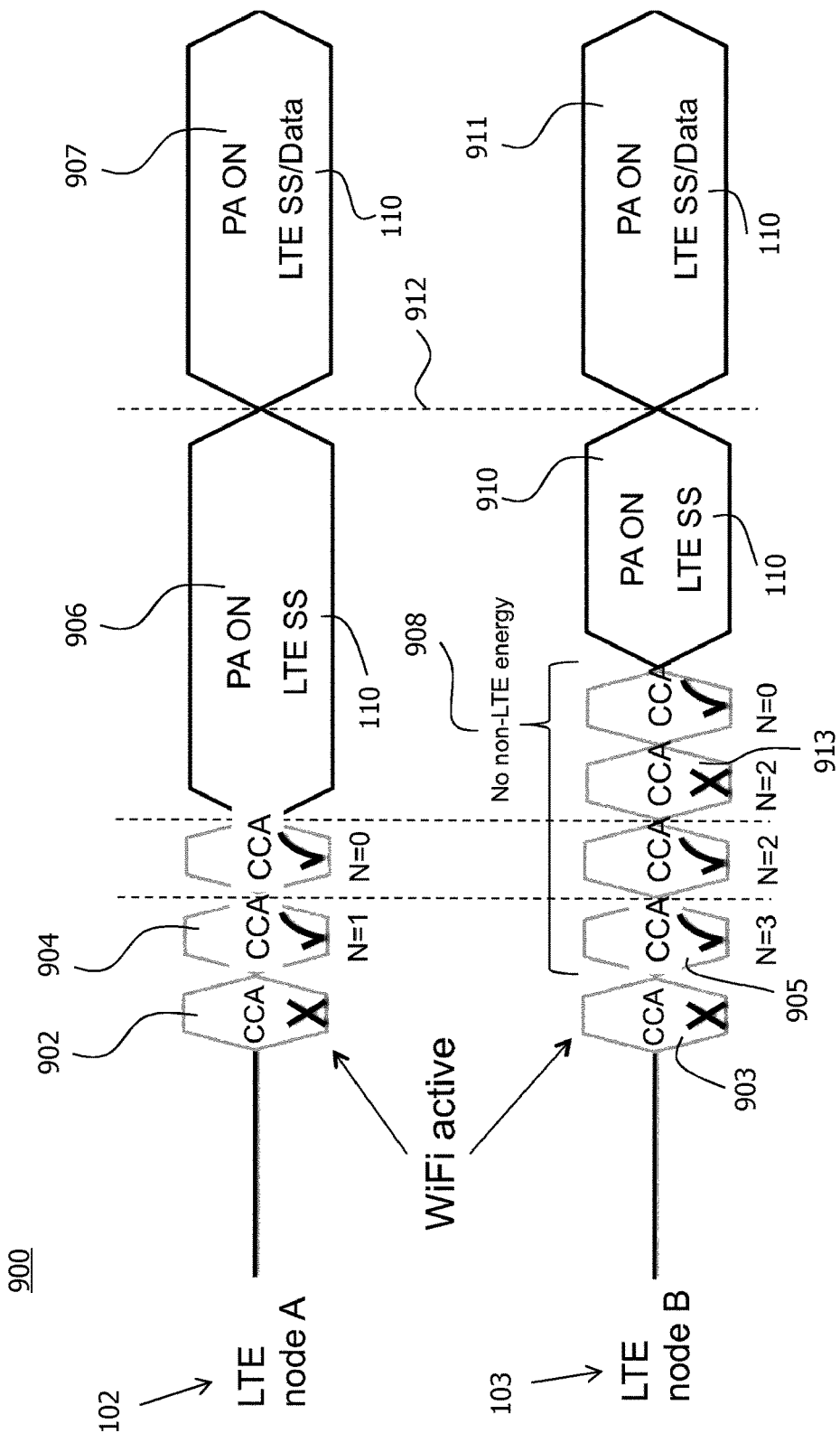
FIG. 9 schematically illustrates a fourth embodiment of a communication including a radio base station operated in the unlicensed spectrum.

FIG. 9 illustrates a fourth embodiment of a communication 900 in the presence of an initial delay in the step 504. Like reference signs ("9xy") indicate features corresponding to those described with reference to the communications 700 and 800.

The LTE node 103 performs a first CCA 913 (e.g., the first CCA without WiFi interference and including the signature sequence 110) and is not able to cancel the LTE signature sequence 110 within the CCA period of the first CCA 913. At some time after the end of the CCA period, the LTE node 103 has performed the detection, computed the estimate for the LTE signature sequence, and filtered the received signal. At that point in time, e.g., in the next CCA period, the LTE node 103 repeats the CCA based on the filtered signal. Accordingly, the two positive CCA results become available in that next CCA period. The back-off parameter N is decreased accordingly by 2 in close-to-real time.

The LTE signature sequence 110 and other LTE signals (e.g., padding data or conventional signals such as Reference Symbols, and payload data, etc.) may be different. The signals may be transmitted differently by the node 103 so that the node 102 is configured to identify and filter (e.g., cancel) the signature sequence 110 from the received signal.

Figure 11:
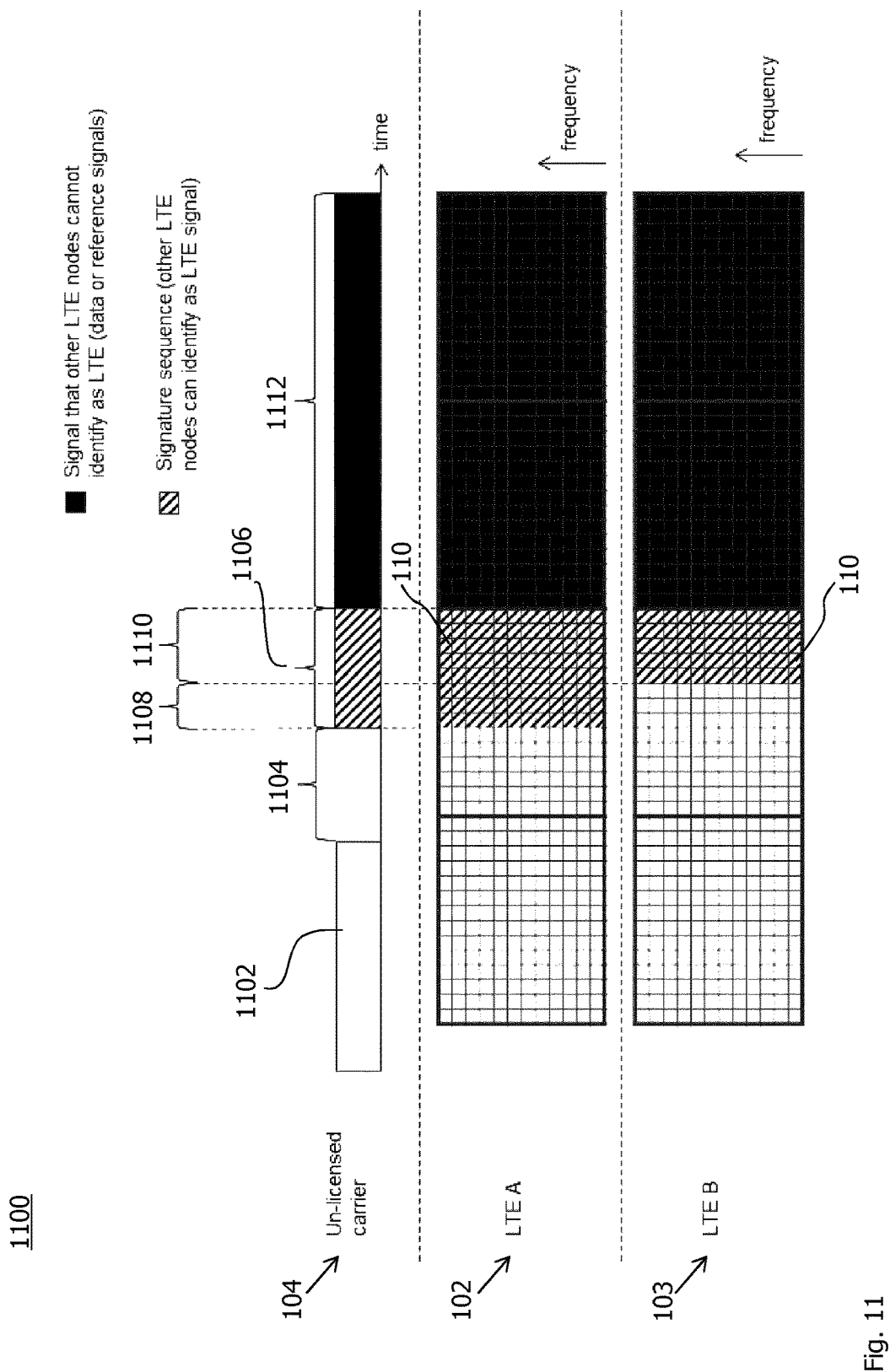
FIG. 11 schematically illustrates a first allocation of resource elements for a signature sequence.
Figure 12:
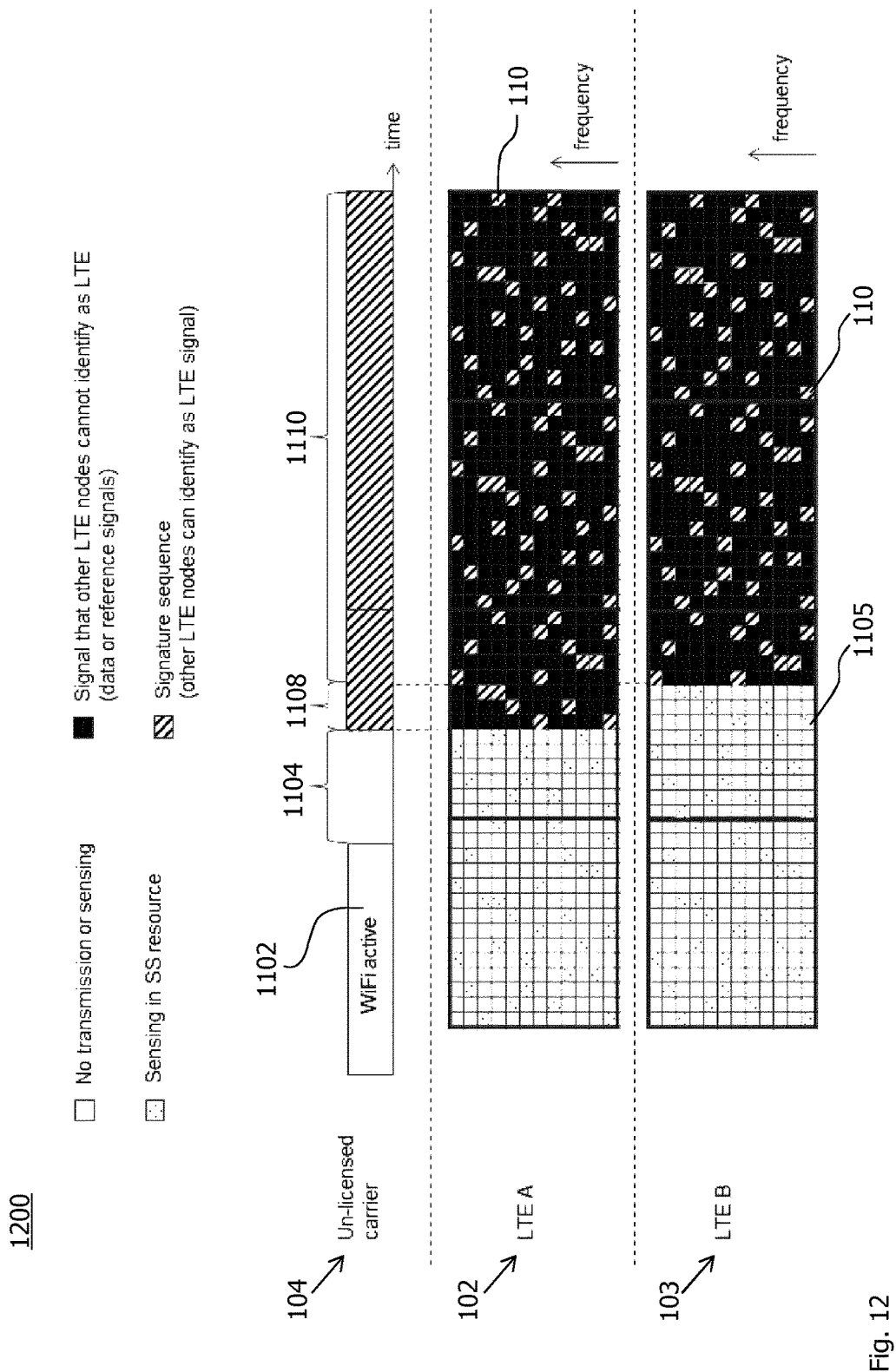
FIG. 12 schematically illustrates a second allocation of resource elements for a signature sequence.

Based on the filtered signal, the node 103 is able to detect a potentially present "hidden node". Exemplary allocations 1100 and 1200 for resource elements are illustrated in FIGS. 11 and 12, respectively. The signature sequence 110 and other LTE signals are allocated so that a receiver (e.g., the node 103) is able to distinguish between the signature sequence 110 and the other LTE signals.

During a time period 1102, the unlicensed carried is not occupied. The nodes 102 and 103 determined by means of CCAs in a time period 1104 that the unlicensed channel is free.

In the allocation 1100, the nodes 102 and 103 (e.g., LAA-LTE nodes) send the signature sequence 110 covering the whole bandwidth of the unlicensed channel. Each of the nodes 102 and 103 transmits no other signal while the signature sequence 110 is sent.

During a time period 1106, the node 102 sends the signature sequence 110. The signature sequence 110 covers all (or almost all) of the bandwidth of the unlicensed channel, in order to ensure that a non-cellular station 104 (e.g., a WiFi station) performing channel sensing determines an occupied channel.

In a time period 1108, the LTE node 103 cancels in the received signal the signature sequence 110 (from the LTE node 102). A CCA based on the filtered signal determines that the unlicensed channel is free (i.e., not occupied by WiFi).

Both node 102 and node 103 send data (and optionally Reference Symbols) in a later time period 1112. Solely base on the radio communication in the time period 1112, another LTE node cannot determine for sure that the received signal originates form an LTE radio access network.

Since the signature sequence 110 is the only signal that is transmitted, other LAA-LTE nodes, e.g., the node 103, can filter out (e.g., cancel) the signature sequence 110, and hence, determine if there is any remaining power in the unlicensed channel (e.g., due to an active WiFi station 104), in which case the unlicensed channel is declared busy. If the first LAA-LTE node 102 were to also include other LTE signals (such as Reference Symbols or payload data), the second LAA-LTE node 103 would not be able to filter out this unknown data, thus failing to perform a proper CCA. The node 103 would not detect an active hidden WiFi station.

The second embodiment of an allocation 1200 (depicted in FIG. 12) uses a signature sequence 110 that occupies only a portion (e.g., only a fraction) of the resource elements (REs) in the space-frequency grid. The allocation of REs to the signature sequence 110 can be sparse. Alternatively or in addition, the signature sequence 110 is positioned according to a pseudo-random pattern known to all nodes 102, 103 and UEs 600. In the time period 1104 (and before that time), the nodes 102 and 103 perform sub-sample sensing only in the signature sequence REs 1105.

The rest of the unlicensed band is filled with other data, e.g., padding data. However, the LAA-LTE nodes 102 and 103 can filter out the signature sequence 110 and then perform CCA on the allocated REs 1105 only. If the REs are sufficiently spread out in time and frequency, the channel sensing is effective.

In the timer period 1110, both nodes 102 and 103 continue sending the signature sequence 110 to enable other LTE nodes to sense only non-LTE energy.

Alternatively, e.g., if the nodes 102 and 103 do not know the "sensing pattern" 1105 of all competing nodes or stations, the channel is filled to clearly indicate channel occupancy according to the allocation 1100.

An advantage of the allocation 1200 is that the sparse allocation of REs 1105 allows continuously transmitted the signature sequence 110 in subsequent subframes embedded in data, which enables other LAA-LTE nodes performing sensing to recognize that it is an LAA-LTE transmission that is ongoing and then share the channel in subsequent subframes using regular (e.g., spectrum-sharing) mechanisms in LTE.

The two or more nodes 102 and 103 of the network 100 and the UEs 600 know a sensing pattern (e.g., a resource element allocation) and a definition of the signature sequence 110. Any signaling for informing the nodes may be carried out by a Radio Resource Control (RRC) layer, e.g., during a set-up procedure. The definition and/or the location of the signature sequence specific for the LTE radio access network 100 is known by all UEs and nodes in the LTE system as a result of RRC signaling.

The sensing pattern and the definition of the signature sequence 110 may be signaled to the device 200 and 300. Alternatively or in addition, the sensing pattern and the definition of the signature sequence 110 are defined by a standard, either explicitly or implicitly by an algorithm for how to compute them. The standard may define a set of signature sequences 110.

The LTE occupancy of the unlicensed channel may be terminated upon expiry of a timer, e.g., defined by a WiFi or LAA-LTE standard.

As has become apparent from above description of exemplary embodiments, embodiments of the technique allow that multiple nodes of a cellular communication network transmit at the same time in a coordinated fashion in unlicensed spectrum, e.g., on WiFi bands. The coordination may be RAT-specific. This increases the efficiency of the spectrum usage, e.g., for the LTE nodes.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A device providing access to other devices according to a cellular radio-access technology, the device comprising:
   processing circuitry; and
   memory containing instructions executable by the processing circuitry whereby the device is operative to:
      perform a clear-channel assessment (CCA) of a channel in an unlicensed spectrum, wherein a result of the CCA indicates if the channel is clear or occupied;
      send, in response to an indication the CCA indicating that the channel is clear, a signal on the channel in the unlicensed spectrum, the signal including a signature sequence indicating that the channel in the unlicensed spectrum is being used by a device according to a cellular radio-access technology; and
      in response the CCA, communicate on the channel in the unlicensed spectrum according to a scheduling mechanism of the cellular radio-access technology, wherein communication on the channel in the unlicensed spectrum comprises transmission of data that includes a signature sequence based on the signal sent on the channel in the unlicensed spectrum, wherein the data is signed using the signature sequence by encrypting a hash value of the data using a private key that is associated with the signature sequence as a public key, wherein sending of the signal and communication on the channel in the unlicensed spectrum are performed simultaneously and within a subframe, and wherein the signature sequence is transmitted continuously or periodically by a network node during regular data transmission.

2. The device of claim 1, wherein the signature sequence is configured to be detected by correlating the signal as received with the signature sequence.

3. The device of claim 1, wherein the signature sequence is transmitted on dedicated resource elements of the cellular radio-access technology.

4. The device of claim 1, wherein the signature sequence differs in time and/or frequency from further signals that are sent in the unlicensed spectrum according to the indicated radio-access technology.

5. The device of claim 1, wherein the instructions are such that the device is operative to trigger generating a pseudo-random number; and wherein a plurality of CCAs is performed, the number being decremented for each CCA result indicating clearance.

6. The device of claim 5, wherein the instructions are such that the device is operative to trigger exchanging the generated pseudo-random number between nodes configured for using the cellular radio-access technology in the unlicensed spectrum.

7. The device of claim 1, wherein the signature sequence uniquely identifies at least one of a node performing the communication on the unlicensed spectrum and a radio-access network including the node.

8. The device of claim 1, wherein the signature sequence is time-dependent.

9. A device providing access to other devices according to a cellular radio-access technology, the device comprising:
   processing circuitry; and
   memory containing instructions executable by the processing circuitry whereby the device is operative to:
      receive a signal in the unlicensed spectrum, the signal including a signature sequence indicating that the unlicensed spectrum is used by a device according to a cellular radio-access technology, wherein the signature sequence is transmitted continuously or periodically by a network node when using a channel during regular data transmission;
      perform a clear-channel assessment (CCA) based on the received signal, wherein a result of the CCA indicates if the channel in the unlicensed spectrum is clear or occupied, and wherein the signature sequence is detected from the received signal; and
      communicate, in response to the CCA, on the channel in the unlicensed spectrum according to a scheduling mechanism of the cellular radio-access technology, wherein communication on the channel in the unlicensed spectrum comprises transmission of data that includes a signature sequence based on the signal received on the channel in the unlicensed spectrum, wherein the data is signed using the signature sequence by encrypting a hash value of the data using a private key that is associated with the signature sequence as a public key.

10. The device of claim 9, wherein the instructions are such that the device is operative to detect the signature sequence by correlating the signal as received with the signature sequence.

11. The device of claim 9, wherein the signature sequence is received on dedicated resource elements.

12. The device of claim 9, wherein the signature sequence differs in time and/or frequency from further signals that are sent in the unlicensed spectrum according to the indicated radio-access technology.

13. The device of claim 9, wherein the instructions are such that the device is operative to:
perform an initial CCA based on the signal as received, a result of the initial CCA indicating that the unlicensed spectrum is occupied; and
decode the signature sequence from the received signal.

14. The device of claim 9, wherein the radio-access technology uses a frame structure or a subframe structure; and wherein the communicating includes sending padding data until a subsequent frame or subframe boundary.

15. The device of claim 9, wherein the instructions are such that the device is operative to trigger sending the signature sequence or a dedicated signature sequence during the communication.

16. The device of claim 9, wherein the instructions are such that the device is operative to:
generate or receive a pseudo-random number; and
perform a plurality of CCAs, with the number being decremented for each CCA result indicating clearance.

17. A method of communicating on unlicensed spectrum, the method comprising:
performing a clear-channel assessment (CCA) for a channel in the unlicensed spectrum, wherein a result of the CCA indicates if the channel is clear or occupied;
sending, in response to an indication the result of the CCA indicating that the channel is clear, a signal in the unlicensed spectrum, the signal including a signature sequence indicating that the unlicensed spectrum is used by a device according to a cellular radio-access technology; and
communicating, in response to the CCA, on the channel in the unlicensed spectrum according to a scheduling mechanism of the a cellular radio-access technology, wherein communicating on the channel in the unlicensed spectrum comprises a step of transmitting data that includes a signature sequence based on the signal sent on the channel in the unlicensed spectrum, wherein the data is signed using the signature sequence by encrypting a hash value of the data using a private key that is associated with the signature sequence as a public key, wherein sending the signal and communicating on the channel in the unlicensed spectrum are performed simultaneously and within a subframe, and wherein the signature sequence is transmitted continuously or periodically by a network node when using the channel during regular data transmission.

18. A method of communicating on unlicensed spectrum, the method comprising:
receiving a signal in the unlicensed spectrum, the signal including a signature sequence indicating that the unlicensed spectrum is used by a device according to a cellular radio-access technology; wherein the signature sequence is received continuously or periodically from a network node on a channel in the unlicensed spectrum during regular data transmission;
performing a clear-channel assessment (CCA) based on the received signal, wherein a result of the CCA indicates if the channel is clear or occupied, and wherein the signature sequence is detected from the received signal; and
communicating, in response to the CCA, on the channel in the unlicensed spectrum according to a scheduling mechanism of the cellular radio-access technology, wherein communicating on the channel in the unlicensed spectrum comprises a step of transmitting data that includes a signature sequence based on the signal received on the channel in the unlicensed spectrum, wherein the data is signed using the signature sequence by encrypting a hash value of the data using a private key that is associated with the signature sequence as a public key.

* * * * *